(12) United States Patent
Nakamura et al.

(10) Patent No.: US 10,156,267 B2
(45) Date of Patent: Dec. 18, 2018

(54) YOKE FOR CROSS SHAFT UNIVERSAL JOINT AND METHOD FOR MANUFACTURING THE SAME

(71) Applicant: NSK LTD., Shinagawa-ku, Tokyo (JP)

(72) Inventors: Takuma Nakamura, Maebashi (JP); Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/307,579

(22) PCT Filed: May 12, 2015

(86) PCT No.: PCT/JP2015/063694
§ 371 (c)(1),
(2) Date: Oct. 28, 2016

(87) PCT Pub. No.: WO2015/174432
PCT Pub. Date: Nov. 19, 2015

(65) Prior Publication Data
US 2017/0058962 A1 Mar. 2, 2017

(30) Foreign Application Priority Data
May 13, 2014 (JP) ................ 2014-099166

(51) Int. Cl.
*F16D 1/08* (2006.01)
*F16D 3/38* (2006.01)
(Continued)

(52) U.S. Cl.
CPC ............ *F16D 3/387* (2013.01); *B21D 53/88* (2013.01); *B23P 15/00* (2013.01); *F16D 1/0864* (2013.01); *Y10T 403/4617* (2015.01)

(58) Field of Classification Search
CPC .......... B21D 53/00–53/92; B23P 15/00; F16D 1/0864; F16D 3/26; F16D 3/38;
(Continued)

(56) References Cited

U.S. PATENT DOCUMENTS 5,018,899 A  5/1991  Kuribara et al.
9,239,083 B2 *  1/2016  Koyama ............... F16D 1/0864
(Continued)

FOREIGN PATENT DOCUMENTS

CN   203176201 U   9/2013
FR   2 858 289 A1   2/2005
(Continued)

OTHER PUBLICATIONS

Translation of JP 2000-320564. Okubo, Kiyoshi. Yoke of Universal Joint and Manufacture Thereof. Nov. 24, 2000.*
(Continued)

*Primary Examiner* — Josh Skroupa
(74) *Attorney, Agent, or Firm* — Sughrue Mion, PLLC

(57) ABSTRACT

In a yoke for a cross shaft universal joint, the circumferential phases of the arrangement direction X of a pair of connecting arm parts and the arrangement direction Y of first and second flange parts are shifted from each other. A bolt is tightened to put the first and second flange parts nearer to each other, thereby applying mutually approaching forces to the connecting arm parts in directions inclined relative to the axes of circular holes. Thus, cup bearings incorporated in the circular holes are pressed against the end of a shaft part constituting a cross shaft, thereby enabling suppression of occurrence of shaking motion between the bearings incorporated in the circular holes and the end of the shaft part of the cross shaft rotatably supported by the bearings.

7 Claims, 12 Drawing Sheets

(51) Int. Cl.
B23P 15/00 (2006.01)
B21D 53/88 (2006.01)

(58) Field of Classification Search
CPC .... F16D 3/382; F16D 3/387; Y10T 403/4614; Y10T 403/4617
USPC ............... 464/134, 135, 182; 403/235, 236; 72/379.2
See application file for complete search history.

(56) References Cited

U.S. PATENT DOCUMENTS

2014/0020487 A1\* 1/2014 Neidlinger, II ....... F16D 1/0864
74/89.17
2014/0364242 A1 12/2014 Koyama et al.

FOREIGN PATENT DOCUMENTS

| | | | | |
|---|---|---|---|---|
| FR | 2863674 A1 \* | 6/2005 | ............. | F16D 3/387 |
| JP | 0235223 A | 2/1990 | | |
| JP | 3-41220 A | 2/1991 | | |
| JP | 2000-320564 A | 11/2000 | | |
| JP | 2003-28188 A | 1/2003 | | |
| JP | 2005-48803 A | 2/2005 | | |
| JP | 2007-327590 A | 12/2007 | | |
| JP | 2009-8174 A | 1/2009 | | |
| JP | 2012-37043 A | 2/2012 | | |
| JP | 2013-160370 A | 8/2013 | | |
| JP | 2013-177949 A | 9/2013 | | |
| KR | 10 2005 001 082 A1 | 6/2006 | | |

OTHER PUBLICATIONS

International Search Report dated Aug. 4, 2015 issued by the International Searching Authority in counterpart International Application No. PCT/JP2015/063694 (PCT/ISA/210/220).
Written Opinion dated Aug. 4, 2015 issued by the International Searching Authority in counterpart International Application No. PCT/JP2015/063695 (PCT/ISA/237).
Communication dated Sep. 19, 2017 issued by the Japanese Patent Office in counterpart Application No. 2016-519277.
Communication dated May 2, 2018, from the State Intellectual Property Office of People's Republic of China in counterpart Application No. 201580021697.3.
Communication issued by the European Patent Office dated Jan. 4, 2018 in counterpart European Patent Application No. 15793199.9.

\* cited by examiner

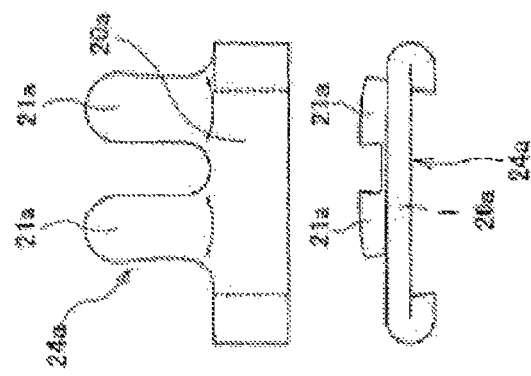
FIG. 3A₁  FIG. 3B₁  FIG. 3C₁
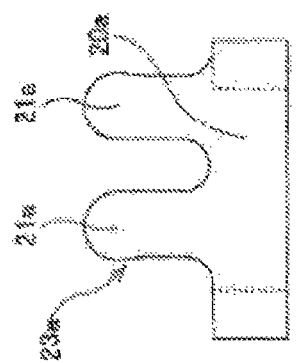
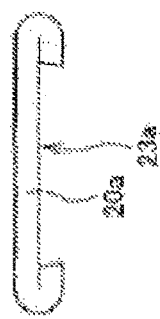
FIG. 3A₂  FIG. 3B₂  FIG. 3C₂
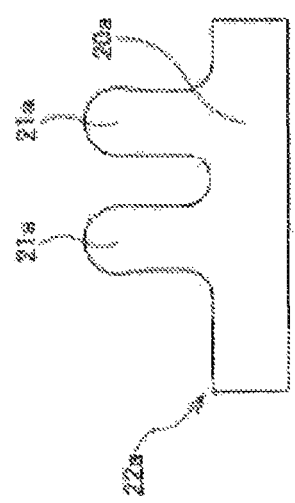

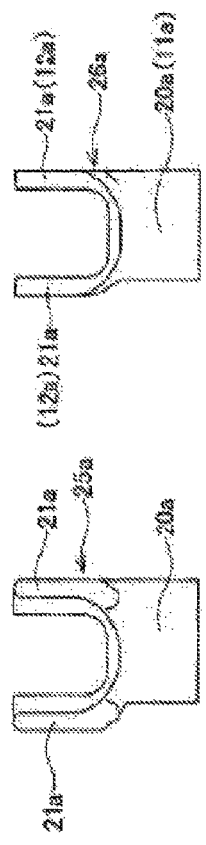 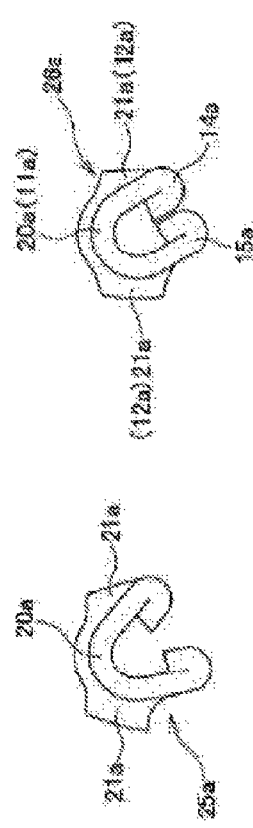
Fig. 3D₁  Fig. 3E₁
Fig. 3D₂  Fig. 3E₂

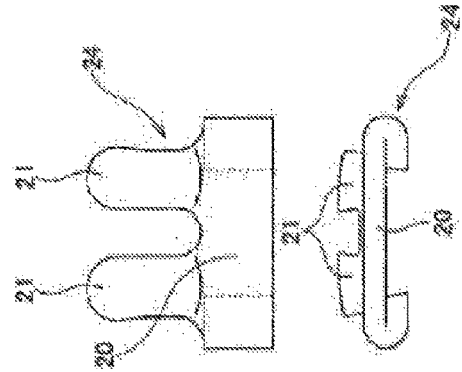
Fig. 11A₁ Prior Art
Fig. 11B₁ Prior Art
Fig. 11C₁ Prior Art
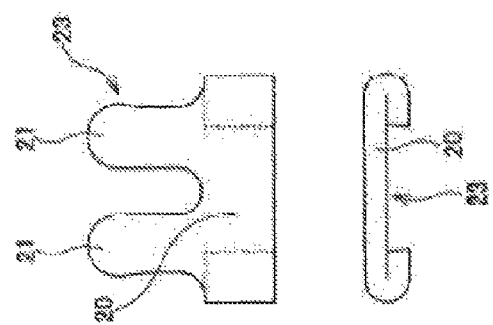
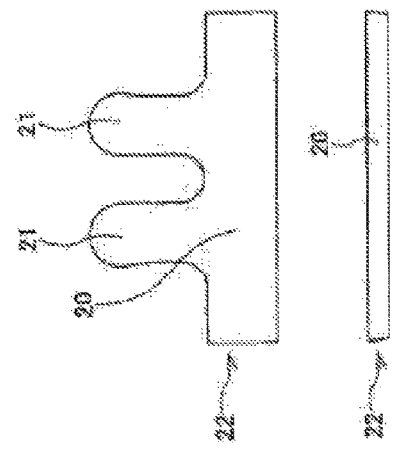
Fig. 11A₂ Prior Art
Fig. 11B₂ Prior Art
Fig. 11C₂ Prior Art

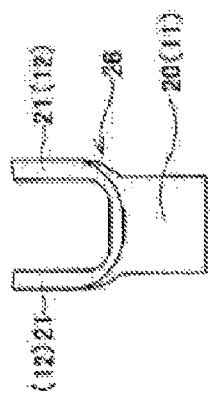
Fig. 11E₁
Prior Art
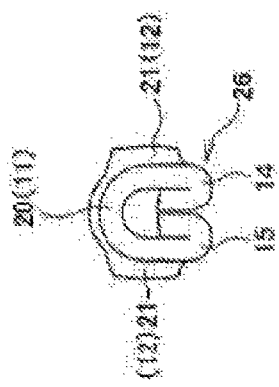
Fig. 11E₂
Prior Art
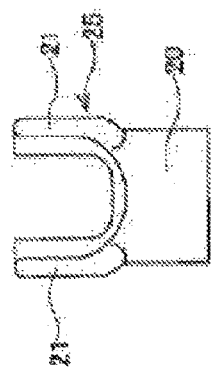
Fig. 11D₁
Prior Art
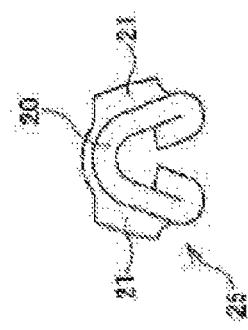
Fig. 11D₂
Prior Art

YOKE FOR CROSS SHAFT UNIVERSAL JOINT AND METHOD FOR MANUFACTURING THE SAME

TECHNICAL FIELD

The invention relates to an improved yoke constituting, for example, a cross shaft universal joint (cardan joint) for connecting together rotation shafts constituting a vehicle steering apparatus in a torque transmittable manner.

BACKGROUND ART

A vehicle steering apparatus is structured as shown in FIG. 7. The movement of a steering wheel 1 to be operated by a driver is transmitted to an input shaft 6 of a steering gear unit 5 through a steering shaft 2, a universal joint 3, an intermediate shaft 4 and another universal joint 3. And, a pair of right and left tie rods 7, 7 are pushed and pulled by a rack and opinion mechanism built in the steering gear unit 5 to thereby apply proper steering angles to a pair of right and left steering wheels according to the operation amount of the steering wheel 1. Here, as the intermediate shaft 4, generally, there is used a shaft structured such that, as shown in FIG. 8, the one-side ends of an outer shaft 8 and an inner shaft 9 are serration engaged with each other to thereby enable torque transmission and contraction in a collision accident. The universal joints 3, 3 are connected to the other-side ends of the shafts 8, 9.

As the universal joints 3, 3 to be incorporated into the steering apparatus, there are used, for example, such cross shaft universal joints as disclosed in the patent document 1. Description is given of a conventional structure of one of yokes constituting such cross shaft universal joints and including a basic structure to be aimed at by the invention with reference to FIGS. 9 to 11E. A yoke 10 of the conventional structure is a so called press yoke which is formed by punching and bending sequentially a metal plate such as steel material using a press, and includes a base part 11 and a pair of connecting arm parts 12, 12.

The base part 11 has a partially-lacking cylindrical shape and includes a discontinuous portion (slit) 13 for enabling expansion and compression of the inside diameter of the base part 11 in one circumferential location thereof. It also includes first and second flange portions 14, 15 while they are sandwiching the discontinuous portion 13 from both sides in the circumferential direction thereof. It further includes a female serration 16 in the inner peripheral surface thereof. Also, because a metal plate is folded back, the first and second flange portions 14, 15 have a double thickness dimension of a metal plate. The first and second flange portions 14, 15 have a through hole 17 and a screw hole 18 at the mutually matching positions of the first and second flange portions 14, 15 while the through hole 17 and the screw hole 18 are respectively twisted with respect to the axis of the base part 11. Also, in the free state of the yoke 10, the first and second flange portions 14, 15 are substantially parallel to each other, while the through hole 17 and screw hole 18 are arranged concentrically with each other.

The connecting arm parts 12, 12 extend in the axial direction from such two locations of the one axial end edge (in FIG. 9, upper end edge) of the base part 11 as are opposed to each other in the diameter direction of the base part 11. Also, the arrangement direction (in FIGS. 9 and 10, right and left direction) of the connecting arm parts 12, 12 is circumferentially coincident (parallel to) with the arrangement direction (in FIG. 10, right and left direction) of the first and second flange portions 14, 15. And, the connecting arm parts 12, 12 include mutually concentric circular holes 19, 19 in their respective tip portions.

As shown in FIG. 11A, the yoke 10 having the above structure is made of a flat material plate 22 which includes a base plate part 20 and a pair of tongue-like parts 21, 21. Firstly, the two ends of the base plate part 20 of this material plate 22 are respectively folded back 180° in their respective middle portions, thereby providing a first intermediate material 23 as shown in FIG. 11B. Next, the first intermediate material 23 is pressed between a pair of extrusion molding dies to be deformed plastically, thereby providing a second intermediate material 24 as shown in FIG. 11C. In the second intermediate material 24, the tongue-like parts 21, 21 to provide the pair of connecting arm parts 12, 12 are curved in a partially cylindrical manner, the base end near portions of the tongue-like parts 21, 21 are bent substantially in a crank shape, and the intermediate portions of the tongue-like parts 21, 21 to the tip end near portions thereof are offset with respect to the base plate part 20. Next, of the thus-structured second intermediate material 24, the central portion of the base plate part 20 is slightly curved to provide a third intermediate material 25 as shown in FIG. 11D. Next, the base plate part 20 of the third intermediate material 25 is curved further to provide a fourth intermediate material 26 as shown in FIG. 11E. In this state, there are formed the base part 11 and the pair of connecting arm parts 12, 12 to be equipped in the yoke 10 after completed. Finally, the through hole 17 and screw hole 18 are formed in the first, second flange portions 14, 15 constituting the base part 11, the female serration 16 is formed in the inner peripheral surface of the base part 11, and the circular holes 19, 19 are formed in the connecting arm parts 12, 12, thereby providing the yoke 10 as shown in FIGS. 9 and 10.

As shown in FIGS. 12 to 14, to assemble a cross shaft universal joint using the above-produced yoke 10, inside the circular holes 19, 19 formed in the tip portions of the connecting arm parts 12, 12, there are pivotally supported the two ends of one shaft part 28a of a pair of shaft parts 28a, 28b constituting a cross shaft 27. Thus, cup bearings 29, 29 are internally engaged with and fixed to the insides of the circular holes 19, 19.

The cup bearings 29, 29 respectively correspond to shell-type needle bearings and include bottomed cylindrical cups 30, 30 corresponding to shell-type outer rings, and multiple needles 31, 31. And, while the cups 30, 30 are pressure inserted into the circular holes 19, 19, the two ends of one shaft part 28a constituting the cross shaft 27 are respectively inserted into the radial-direction insides of the needles 31, 31. Thus, the two ends of the shaft part 28a are rotatably supported on the yoke 10.

Also, for assembling a steering apparatus, to connect and fix the base part 11 of the yoke 10 to the end of a rotation shaft constituted of any one of the steering shaft 2, intermediate shaft 4 and input shaft (see FIG. 7) in a torque transmittable manner, firstly, the end of the rotation shaft is inserted into the inside of the center hole (serration hole) of the base part 11, in the free state of the yoke 10. Thus, the female serration 16 formed in the inner peripheral surface of the base part 11 is serration engaged with a male serration formed in the outer peripheral surface of the end of the rotation shaft. Next, as shown in FIGS. 12 and 13, a bolt 32 is inserted into the through hole 17 and is threadedly engaged with the screw hole 18, and is further tightened. Thus, the width of the discontinuous part 13 is elastically narrowed, thereby reducing the diameter of the base part 11 elastically. As a result, the surface pressure of the serration engaged part increases, whereby the base end 11 is connected and fixed to the end of the rotation shaft in a torque transmittable manner.

In the yoke 10 having the above structure, for reason of securing the assembling workability of the cup bearings 29, 29, the end of the shaft part 28a constituting the cross shaft 27 is inserted into the radial-direction insides of the needles 31, 31 constituting the cup bearings 29, 29 with a certain degree of clearance. Therefore, when in use, there is a possibility that the end of the shaft part 28a can shake in the diameter direction (radial direction) relative to the cup bearings 29, 29 and can generate strange sounds. Also, such shaking motion can probably become excessively large with long use.

In view of the above circumstances, for example, the patent document 2 discloses an invention in which the peripheral part of a circular hole of a connecting arm part, constituting a yoke, with a cup bearing being pressure inserted therein is plastically deformed to thereby suppress occurrence of shaking motion between the cup bearing and the shaft part of a cross shaft. Also, for example, the patent document 3 discloses an invention in which the shape of a cup constituting a cup bearing is worked (the cylindrical part thereof is deformed) to thereby suppress occurrence of shaking motion between the cup bearing and the shaft part of a cross shaft. However, in both of the inventions of the patent documents 2 and 3, for suppression of occurrence of shaking motion, exclusive working on the connecting arm part or cup is necessary. This inevitably increases the working cost of the cross shaft universal joint.

Here, in the conventional structure shown in FIGS. 9 to 14, the circumferential phases of the arrangement direction of the pair of connecting arm parts 12, 12 and the arrangement direction of the first, second flanges 14, 15 are identical with each other. Thus, even when the first, second flanges 14, 15 are deformed in their mutually approaching directions by tightening the bolt 32, as shown by a thick arrow in FIG. 14, the connecting arm parts 12, 12 are simply flexually deformed in the mutually approaching directions in the axial direction of the circular holes 19, 19 which is a direction parallel to the arrangement direction of the first, second flange portions 14, 15; that is, there does not occur such deformation as can reduce the above-mentioned shaking motion.

RELATED ART REFERENCE

Patent Document

Patent Document 1: JP-A-2012-37043
Patent Document 2: JP-A-2003-28188
Patent Document 3: JP-A-2007-327590

SUMMARY OF THE INVENTION

Problems to be Solved by the Invention

In view of the above circumstances, the invention aims at realizing at low costs a yoke for a cross shaft universal joint which can suppress occurrence of shaking motion between a bearing incorporated in a circular hole and the end of the shaft part of a cross shaft rotatably supported by the bearing.

Means for Solving the Problems

A yoke for a cross shaft universal joint of the invention includes: a base part for connecting and fixing the end of a rotation shaft thereto; and a pair of connecting arm parts respectively extending in the axial direction from two diametrically opposite positions corresponding to the base part at one axial end edge of the base part, wherein: the pair of connecting arm parts include a pair of circular holes formed at tip portions thereof to be concentric with each other, the pair of circular holes being configured to pivotally support the end of a shaft part, forming a cross shaft, through bearings; the base part has a partially-lacking cylindrical shape and includes a discontinuous part in one circumferential location thereof; and the base part includes: a pair of flange parts formed across the discontinuous part; and a pair of mounting holes formed in the mutually matching portions of the pair of flange parts.

Here, the above-mentioned bearings are not limited to cup bearings (shell-type needle bearings) but there can be employed various bearings such as a sliding bearing.

Particularly, in the yoke for a cross shaft universal joint of the invention, the circumferential phases of the arrangement direction (the axial direction of the axes of the circular holes) of the pair of connecting arm parts and the arrangement direction (the expansion direction of the discontinuous part) of the pair of flange parts are shifted from each other (are arranged not in parallel to each other).

That is, an angle between the arrangement direction of the pair of connecting arm parts and the arrangement direction of the pair of flange parts is set larger than 0° and smaller than 90° (preferably, larger than 10° and smaller than 60°, more preferably, larger than 20° and smaller than 40°).

Also, the flange parts are put nearer to each other up to a dimension capable of fixing the end of the rotation shaft inside the base part, thereby applying mutually approaching forces to the pair of connecting arm parts in directions inclined relative to the axes of the pair of circular holes.

In enforcing the above yoke for a cross shaft universal joint of the invention, for example, the axes of the pair of mounting holes are set coincident with the thickness direction of the pair of flange parts.

In enforcing the above yoke for a cross shaft universal joint of the invention, for example, the arrangement direction of the circular holes and the arrangement direction of the pair of connecting arm parts are set coincident with each other, the axial direction of the axes of the pair of mounting holes and the arrangement direction of the pair of flange parts are set coincident with each other, and the axial direction of the axes of the pair of circular holes and the axial direction of the axes of the pair of mounting holes are shifted from each other in phase in the circumferential direction (they are arranged not in parallel to each other).

Further, in enforcing the above yoke for a cross shaft universal joint of the invention, for example, the mounting hole formed in one of the pair of flange parts is constituted of a through hole, whereas the mounting hole formed in the other flange part is constituted of a screw hole.

Also, a method for manufacturing a yoke for a cross shaft universal joint of the invention includes: forming a flat material plate including a base plate part providing the base plate and a pair of tongue-like parts providing the pair of connecting arm parts, the pair of tongue-like parts being arranged shifted from the length-direction center thereof toward the length-direction one side thereof; folding back 180° the two ends of the base plate part of the material plate with the same folding amounts to form a first intermediate material; plastically deforming the first intermediate material such that the pair of tongue-like parts are curved in partially cylindrical shapes, the base end near portions of the pair of tongue-like parts are bent substantially in crank shapes, and the intermediate portion near portions to the leading end near portions of the pair of tongue-like parts are offset with respect to the base plate part, thereby forming a second intermediate material; curving the base plate part of the second intermediate material to thereby form the base part and the pair of connecting arm parts of the yoke; and forming the pair of mounting holes in the pair of flange parts and the pair of circular holes in the connecting arm parts.

In enforcing the above yoke for a cross shaft universal joint of the invention, for example, when the curving, the base part and pair of connecting arm parts of the yoke may also be formed in such a manner that the base plate part of the third intermediate material is further curved after the central portion of the base plate part of the second intermediate material is curved to form a third intermediate material.

Advantages of the Invention

According to the above structured yoke for a cross shaft universal joint of the invention, a structure capable of suppressing occurrence of shaking motion between the bearings incorporated in the circular holes and the end of the shaft part of the cross shaft supported rotatably by the bearings can be realized at low costs.

That is, in the invention, since the circumferential phases of the arrangement direction of the pair of connecting arm parts and the arrangement direction of the pair of flange parts are shifted from each other, by tightening a fastening member such as a bolt inserted through the mounting holes formed in the pair of flange parts to put the flange parts nearer to each other, mutually approaching forces can be applied to the pair of connecting arm parts in directions inclined relative to the axes of the pair of circular holes. This can prevent formation of a radial clearance between the bearings incorporated in the circular holes and the end of the shaft part of the cross shaft inserted into the bearings, thereby enabling suppression of occurrence of shaking motion between the bearings and the end of the shaft part. Also, in the invention, since there is eliminated the need for exclusive working for suppression of such shaking motion occurrence, the working cost of the yoke for a cross shaft universal joint and thus a cross shaft universal joint including the yoke for a cross shaft universal joint of the invention can be reduced, thereby enabling cost reduction.

Also, according to the above-structured method for manufacturing a yoke for a cross shaft universal joint of the invention, since the pair of tongue-like parts to provide the pair of connecting arm parts are arranged shifted toward the length-direction one side from the length-direction central portion of the base plate part, when forming the flat material plate, the finished yoke is formed such that the circumferential phases of the arrangement direction of the pair of connecting arm parts and the arrangement direction of the pair of flange parts are shifted from each other. Thus, a structure capable of suppressing occurrence of shaking motion between the bearings incorporated in the circular holes and the end of the shaft part of the cross shaft supported rotatably by the bearings can be realized at low costs.

BRIEF DESCRIPTION OF THE DRAWINGS

FIGS. 3A to 3E are typical views of an example of a method for manufacturing the yoke of FIG. 1, showing the sequence of the steps thereof.

FIGS. 11A to 11E are typical views of a method for manufacturing the yoke of FIG. 9 having the conventional structure, showing the sequence of the steps thereof.

MODES FOR CARRYING OUT THE INVENTION

First Embodiment

Figure 1:
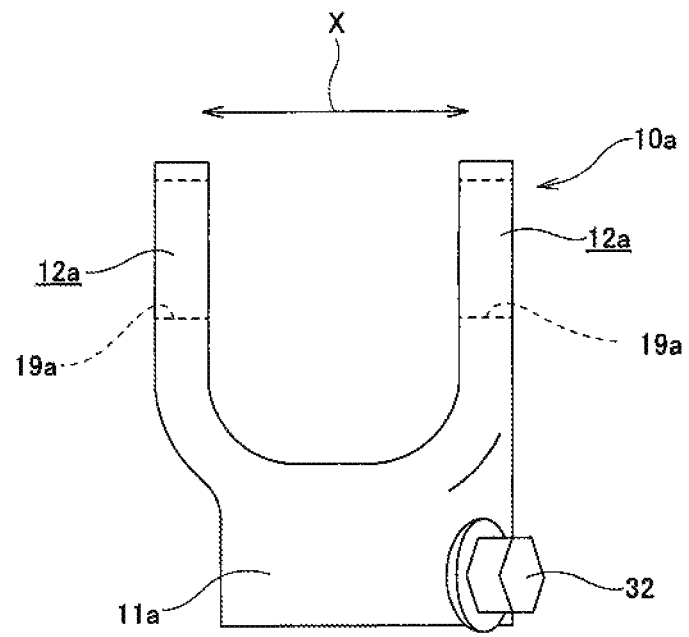
FIG. 1 is a side view of a yoke for a cross shaft universal joint according to a first embodiment of the invention.

FIGS. 1 to 6 show an example of a yoke for a cross shaft universal joint according to a first embodiment of the invention. Here, the yoke 10a of this embodiment is characterized in that the circumferential phases of the arrangement direction of a pair of connecting arm parts 12a, 12 and the arrangement direction of a pair of first and second flange parts 14a, 15a are shifted from each other (arranged not in parallel to each other). The structures and operations of the remaining parts thereof are similar to those of the above-mentioned conventional structure of FIGS. 9 to 14. Therefore, the equivalent parts are given the same designations and thus the duplicated description thereof is omitted or simplified. And, description is given below mainly of parts not described above and the characteristic parts of this embodiment.

The yoke 10a of this embodiment is a so called press yoke to be formed by enforcing punching and bending operations sequentially on a metal plate such as a steel member using a press, and includes a base part 11a and a pair of connecting arm parts 12a, 12a.

The base part 11a has a partially lacking cylindrical shape which includes: a discontinuous part 13a penetrating in the axial direction therethrough in one circumferential location thereof; and the first and second flange parts 14a and 15a in the two locations of the base part sandwiching the discontinuous part 13a from the two circumferential sides. Since the metal plate is folded back, the first and second flange parts 14a and 15a each have a double thickness of a metal plate and respectively include, in the mutually matching locations thereof, a through hole 17a and a screw hole 18a formed concentrically with each other. Also, in this embodiment, the axes of the through hole 17a and screw hole 18a are coincident with the thickness direction of the first and second flange parts 14a and 15a.

Also, the connecting arm parts 12a, 12a extend in the axial direction of the base part 11a from such two locations of the one axial end edge (in FIGS. 1 and 4, upper end edge) of the base part 11a as exist on the mutually opposite sides in the diameter direction of the base part 11a. And, the connecting arm parts 12a, 12a include in the tip portions thereof two concentric circular holes 19a and 19a.

Figure 2:
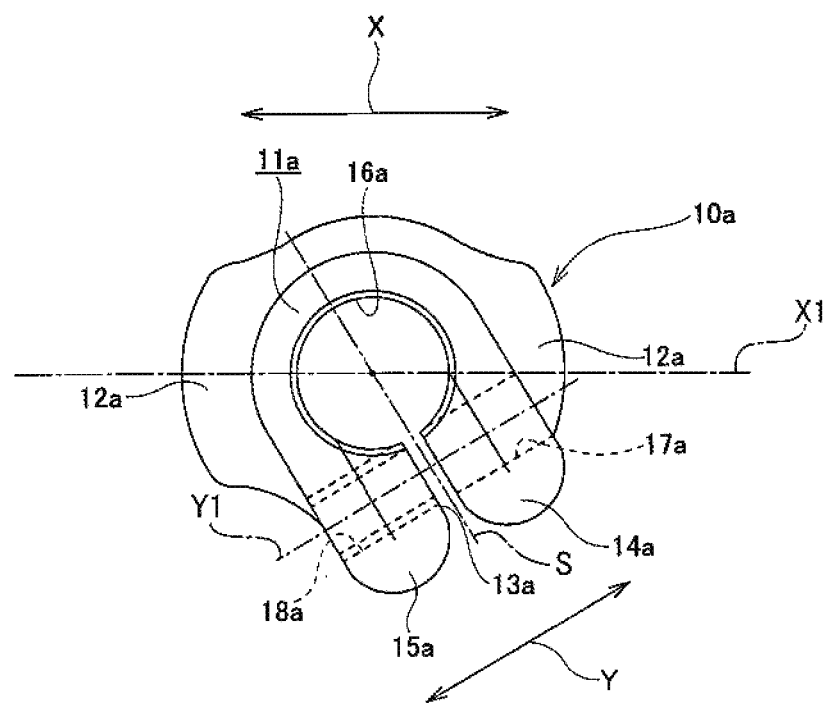
FIG. 2 is an end view of the yoke of FIG. 1 when viewed from below.
Figure 6:
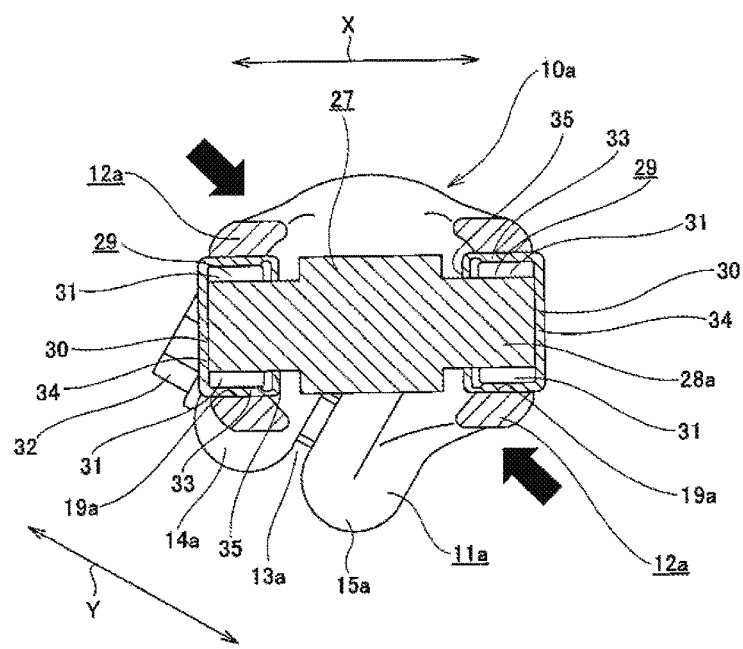
FIG. 6 is a section view of the yoke of FIG. 4, taken along the VI-VI line of FIG. 4.
Figure 7:
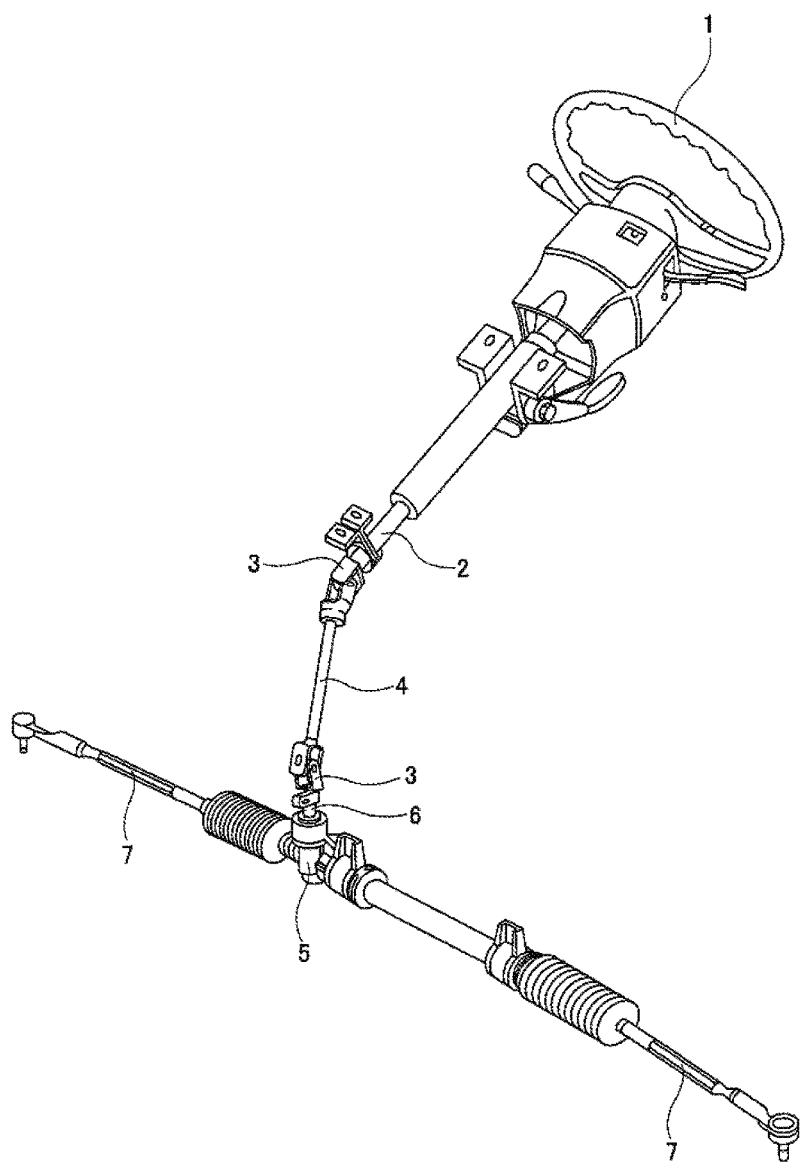
FIG. 7 is a perspective view of an example of a steering apparatus with a universal joint incorporated therein.
Figure 8:
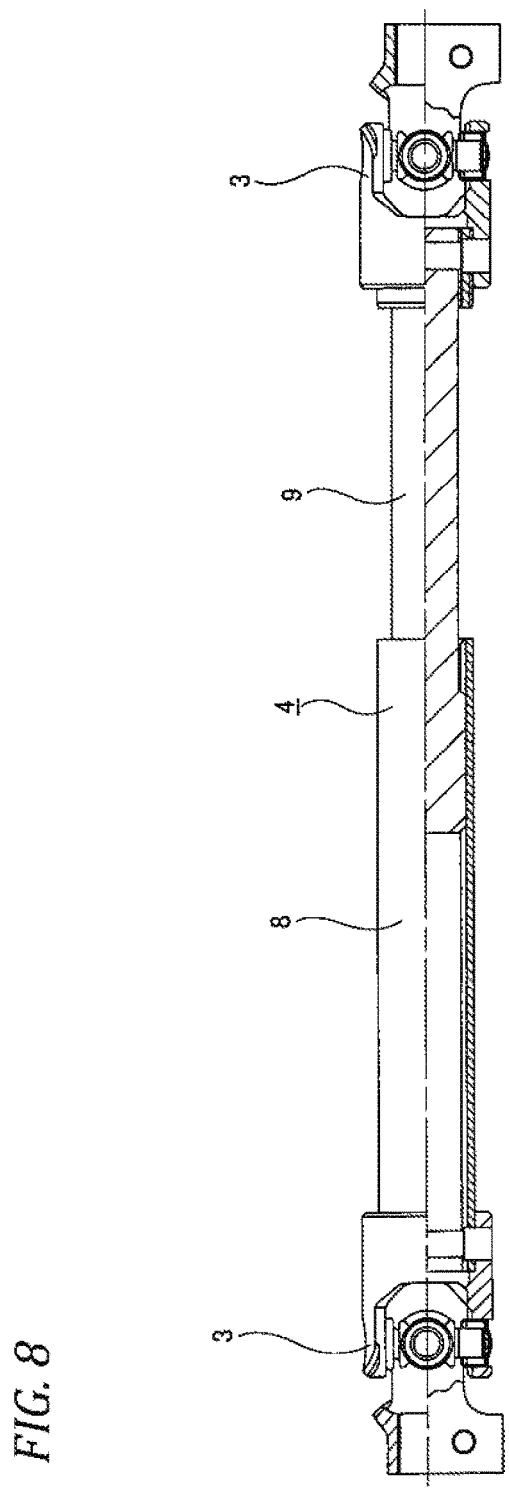
FIG. 8 is a partially sectional side view of an intermediate shaft with cross shaft universal joints assembled to the two ends thereof.
Figure 9:
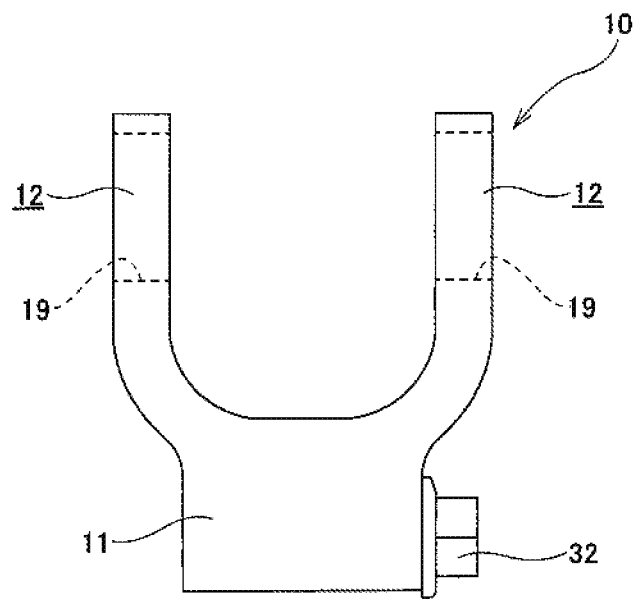
FIG. 9 is a side view of a yoke having a conventional structure.
Figure 10:
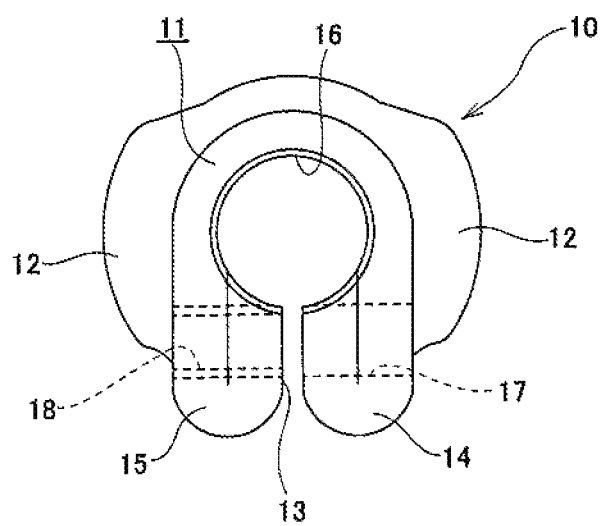
FIG. 10 is an end view of the yoke of FIG. 9 when viewed from below.
Figure 12:
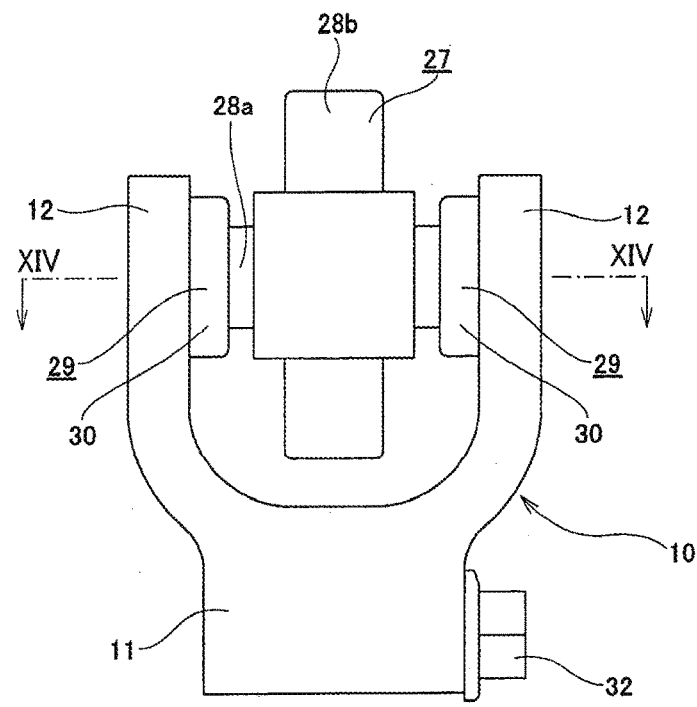
FIG. 12 corresponds to FIG. 9 and shows how a cup bearing incorporated in the yoke supports a cross shaft.
Figure 13:
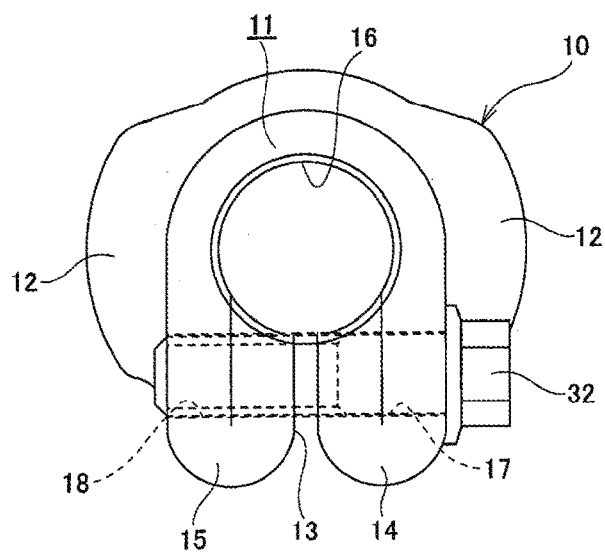
FIG. 13 corresponds to FIG. 10 and shows a state where a bolt is fastened to the yoke.
Figure 14:
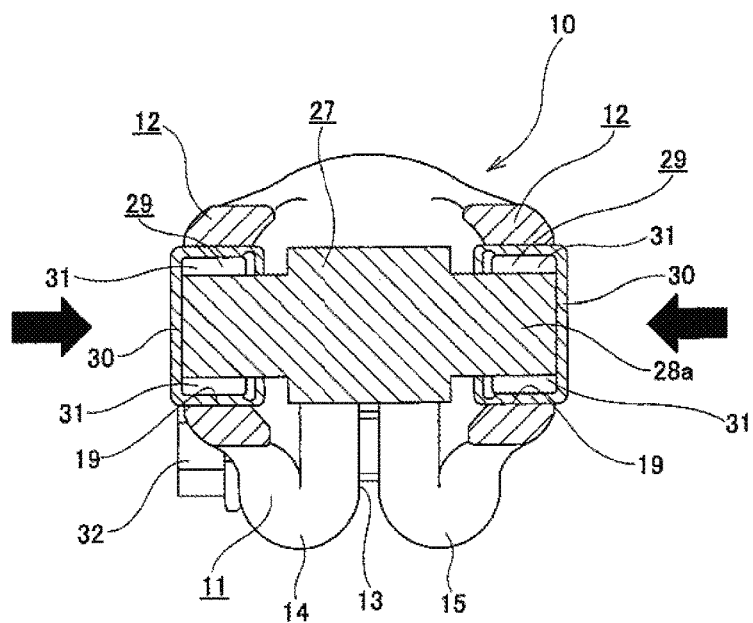
FIG. 14 is a section view of the yoke of FIG. 12, taken along the XIV-XIV line of FIG. 12.

Particularly, in this embodiment, the circumferential phases of the arrangement direction {the X direction (right and left direction) of FIGS. 1, 2 and 6, and the same direction as the axial direction X1 of the axes of the first, second circular holes 19a, 19a} of the connecting arm parts 12a, 12a and the arrangement direction {the Y direction of FIGS. 2, 6 and the same direction as the expansion direction of the discontinuous part 13a and the axial direction Y1 of the axes of the through hole 17a and screw hole 18a} of the first and second flange parts 14a, 15a are shifted from each other. In other words, the arrangement direction of the connecting arm parts 12a, 12a and the arrangement direction of the first, second flange parts 14a, 15a are arranged not in parallel to each other (and at a non-right angle). Specifically, the arrangement direction of the first, second flange parts 14a, 15a is set shifted (inclined), for example, 10 to 60° (in the illustrated example, 30°) from the arrangement direction of the connecting arm parts 12a, 12a. Here, the shift amount (inclination angle) between the two arrangement directions can be determined properly according to the shape of the yoke 10a (particularly, the rigidity size of the connecting arm parts 12a, 12a) and the size of a radial clearance between a cup bearing 29 and the end of a shaft part 28a (which are described later).

Therefore, the circumferential phases of the axial direction X1 of the axes of the pair of circular holes 19a, 19a and the axial direction Y1 of the axes of the through hole 17a and screw hole 18a are shifted from each other. Specifically, the axial direction Y1 of the axes of the through hole 17a and screw hole 18a is set shifted (inclined), for example, 10 to 60° (in the illustrated example, 30°) from the axial direction X1 of the axes of the pair of circular holes 19a, 19a.

Also, as shown in FIG. 2, when viewed from below, that is, from the axial direction of the rotation shaft, the axial direction X1 of the axes of the pair of circular holes 19a, 19a and the extension direction S of the discontinuous part 13a cross each other at a non-right angle.

As shown in FIG. 3A, the above-structured yoke 10a of this embodiment is made of a flat material plate 22a which, for example, includes a base plate part 20a and a pair of tongue-like parts 21a, 21a. In the material plate 22a, the tongue-like parts 21a, 21a are disposed shifted toward the length-direction one side (in FIGS. 3A to 3E, the right side) from the length-direction center of the base plate part 20a. Such material plate 22a can be obtained, similarly to the material plate 22 formed according to the conventional manufacturing method shown previously in FIG. 11A, by punching a metal plate between a punching die and a receiving die. The two ends of the base plate part 20a of this material plate 22a are folded back 180° respectively, thereby providing a first intermediate material 23a as shown in FIG. 3B. In this embodiment, in the state of the material plate 22a, such portions of the base plate part 20a as project toward both sides from the tongue-like parts 21a, 21a are different in length dimension from each other, but the fold-back amounts of the two ends of the base plate part 20a are set equal to each other. Next, the first intermediate material 23a is pressed between a pair of pressing dies and is plastically deformed, thereby providing a second intermediate material 24a as shown in FIG. 3C. In this second intermediate material 24a, the tongue-like parts 21a, 21a thereof to provide the pair of connecting arm parts 12a, 12a are curved in a partially cylindrical manner; and the base end near portions of the tongue-like parts 21a, 21a are bent substantially in a crank shape and the intermediate portion near portions of the tongue-like parts 21a, 21a to the leading end near portions thereof are offset with respect to the base plate part 20a. Next, in the second intermediate material 24a, the central portion of the base plate part 20a is slightly curved, thereby providing a third intermediate material 25a as shown in FIG. 3D. Then, the base plate part 20a of the third intermediate material 25a is curved further, thereby providing a fourth intermediate material 26a as shown in FIG. 3E. In this state, there are formed the base part 11a and the pair of connecting arm parts 12a, 12a to be equipped in the completed yoke 10a. Finally, the through hole 17a and screw hole 18a are formed in the first, second flanges 14a, 15a constituting the base part 11a, the female serration 16a is formed in the inner peripheral surface of the base part 11a, and the circular holes 19a, 19a are formed in the connecting arm parts 12a, 12a, respectively, thereby providing the yoke 10a as shown in FIGS. 1 and 2.

Figure 4:
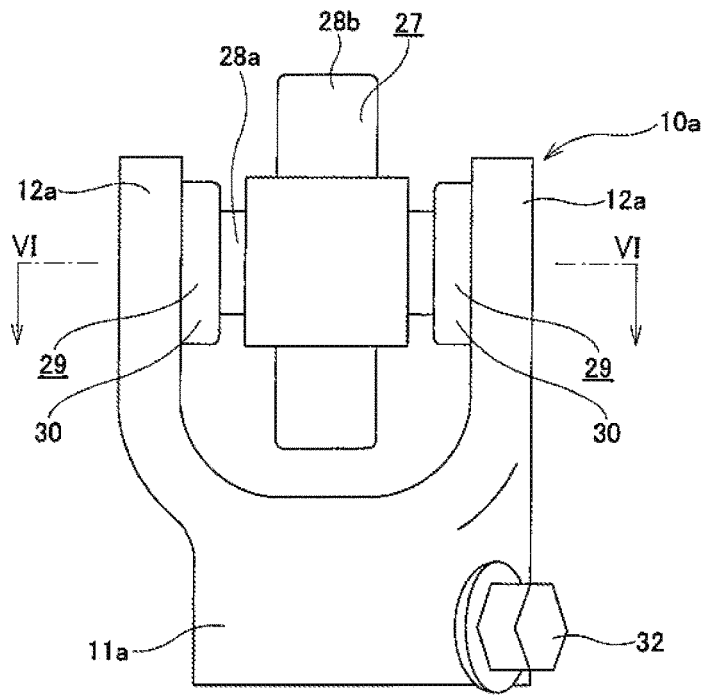
FIG. 4 corresponds to FIG. 1 and shows how a cup bearing incorporated in the yoke supports a cross shaft.
Figure 5:
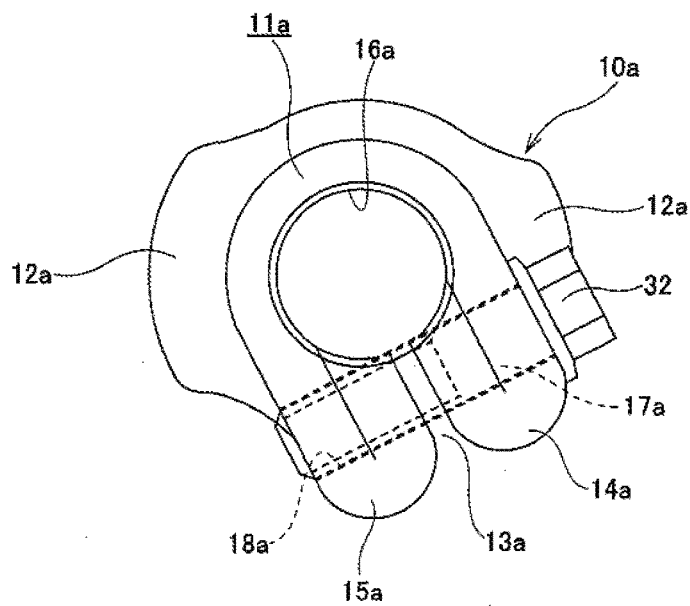
FIG. 5 corresponds to FIG. 2 and shows a state where a bolt is fastened to the yoke.

As shown in FIGS. 4 to 6, to assemble a cross shaft universal joint using the above produced yoke 10a, the two ends of one shaft part 28a of the pair of shaft parts 28a, 28b constituting the cross shaft 27 are pivotally supported on the insides of the circular holes 19a, 19a formed in the tip portions of the connecting arm parts 12a, 12a. Thus, the cup bearings 29, 29 are internally engaged with and fixed to the insides of the circular holes 19a, 19a respectively.

The cup bearings 29, 29 respectively correspond to shell type needle bearings, and include bottomed cylindrical cups 30, 30 corresponding to shell type outer rings and multiple needles 31, 31. The cup 30 is formed by bending a hard metal plate such as a carbon steel plate or a case hardened steel plate using plastic working such as deep drawing, and includes a cylindrical part 33, a bottom part 34 and an inward flange part 35. The bottom part 34 covers the whole of the axial-direction one end side (in a state where the cup bearing is assembled into the circular hole 19a, the outer surface side of the connecting arm part 12a) of the cylindrical part 33. Also, the inward flange part 35 is arranged to be folded radially inward from the axial-direction other end side (in a state where the cup bearing is assembled into the circular hole 19a, the inner surface side of the connecting arm part 12a) of the cylindrical part 33. And, the above-structured cups 30, 30 are pressure inserted into the circular holes 19a, 19a and, of the outer surfaces of the connecting arm parts 12a, 12a, the opening edges of the circular holes 19a, 19a are plastically deformed radially inward to form caulking parts (not shown), thereby preventing the cups 30, 30 from moving outwardly of the circular holes 19a, 19a. Also, the two ends of the shaft part 28a constituting the cross shaft 27 are respectively inserted into the radial insides of the needles 31, 31. Thus, the two ends of the shaft part 28a are rotatably supported with respect to the yoke 10a. Here, in the yoke 10a of this embodiment as well, the ends of the shaft part 28a can be inserted into the radial insides of the needles 31, 31 while having a certain degree of clearance in a stage where the two ends of the shaft part 28a are inserted into the radial insides of the needles 31, 31 (in a state before the bolt 32 is fastened), similarly to the conventional structure. This prevents the assembling workability of the cup bearing 29, 29 from being lowered.

Also, to connect and fix the base part 11a of the yoke 10 of this embodiment to the end of the rotation shaft in a torque transmittable manner, the end of the rotation shaft is inserted into the inside of the center hole (serration hole) of the base part 11a in the free state of the yoke 10a. Thus, the female serration 16a formed in the inner peripheral surface of the base part 11a and a male serration formed in the outer peripheral surface of the end of the rotation shaft are serration engaged with each other. Next, as shown in FIGS. 4 and 5, a bolt (a circular washer equipped bolt) 32 is inserted through the through hole 17a and is threadedly engaged with the screw hole 18a and is fastened further. Thus, since the width of the discontinuous part 13a is elastically narrowed (the first and second flange parts 14a and 15a are put nearer to each other), the base part 11a is elastically reduced in diameter. As a result, the surface pressure of the serration engaged part increases, whereby the base part 11a is connected and fixed to the end of the rotation shaft in a torque transmittable manner.

According to the above-structured yoke 10a for a universal joint of this embodiment, a structure capable of suppressing occurrence of shaking motion between the cup bearings 29, 29 assembled into the circular holes 19a, 19a and the end of the shaft part 28a of the cross shaft 27 rotatable supported by the cup bearings 29, 29 can be realized at low costs.

That is, in this embodiment, since the circumferential phases of the arrangement direction X of the connecting arm parts 12a, 12a and the arrangement direction Y of the first, second flange parts 14a, 15a are shifted from each other, by tightening the bolt 32 to put the first, second flange parts 14a, 15a nearer to each other, as shown by thick arrows in FIG. 6, mutually approaching forces having directions inclined relative to the axes of the circular holes 19a, 19a can be applied to the connecting arm parts 12a, 12a. Thus, due to the flexual deformation of the connecting arm parts 12a, 12a caused by the forces applied, the cup bearings 29, 29 (the needles 31, 31 constituting the same) can be pressed against the two ends of the shaft part 28a. More specifically, the radial-direction inner surface of the needle 31 situated on the upper side of FIG. 6 of the needles 31, 31 constituting the cup bearing 29 arranged on the left side of FIG. 6 is pressed downward from above against the outer peripheral surface of the left-side end of FIG. 6 of the two ends of the shaft part 28a; and the radial-direction inner surface of the needle 31 situated on the lower side of FIG. 6 of the needles 31, 31 constituting the cup bearing 29 arranged on the right side of FIG. 6 is pressed upward from below against the outer peripheral surface of the right-side end of FIG. 6 of the two ends of the shaft part 28a. This can prevent formation of radial-direction clearances between the cup bearings 29, 29 incorporated into the insides of the circular holes 19a, 19a and the two ends of the shaft pan 28a constituting the cross shaft 27 inserted into the insides of the cup bearings 29, 29, thereby enabling suppression of occurrence of shaking motion between the cup bearings 29, 29 and the two ends of the shaft part 28a. Also, this embodiment eliminates the need for such exclusive working to suppress occurrence of shaking motion as is found in the inventions disclosed in the above-cited patent documents 2 and 3, thereby enabling suppression of the working cost of the yoke 10 of this embodiment and thus a cross shaft universal joint including the yoke 10a of this embodiment, that is, enabling cost reduction.

Also, in this embodiment, the axial direction X1 of the axes of the pair of circular holes 19a, 19a is set coincident with the arrangement direction X of the pair of connecting arm parts 12a, 12a, the axial direction Y1 of the axes of the through hole 17a and screw hole 18a is set coincident with the arrangement direction Y of the first, second flange parts 14a, 15a, and the circumferential phases of the axial direction X1 of the axes of the pair of circular holes 19a, 19a and the axial direction Y1 of the axes of the through hole 17a and screw hole 18a are shifted from each other. Therefore, the pair of circular holes 19a, 19a and the through hole 17a, screw hole 18a can be formed in the circumferential-phase intermediate positions of the pair of connecting arm parts 12a, 12a and the first, second flange parts 14a, 15a, whereby, while providing the above effects, the strengths of the pair of connecting arm parts 12a, 12a and the first, second flange parts 14a, 15a can be maintained in good balance.

Also, according to a method for manufacturing the yoke 10a for a cross shaft universal joint of the embodiment having the above structure, since the pair of tongue-like pans 21a, 21a providing the pair of connecting arm parts 12a, 12a are arranged in such positions of the base plate part 20a as are shifted toward the length-direction one side thereof from the length-direction center thereof when forming the flat material plate 22a, the yoke 10a after completed is formed such that the circumferential phases of the arrangement direction of the connecting arm parts 12a, 12a and the arrangement direction of the first, second flange pans 14a, 15a are shifted from each other. Thus, a structure capable of suppressing occurrence of shaking motion between the cup bearings 29, 29 incorporated into the circular holes 19a, 19a and the two ends of the shaft part 28a of the cross shaft 27 rotatable supported by the cup bearings 29, 29 can be realized at low costs.

Here, the invention is not limited to the above embodiment but can be changed or improved properly.

For example, the invention is not limited to the above embodiment in which one of the mounting holes respectively formed in the pair of flange parts is formed as the through hole and the other as the screw hole. For example, there may also be employed a structure that the pair of mounting holes are respectively constituted of through holes and a nut is pressure inserted into and fixed to one of them. Also, the thickness dimension of the flange part is not limited to a double thickness dimension of a metal plate used as a material plate.

Also, the bearing to be incorporated into the circular hole formed in the leading end of the connecting arm part is not limited to the cup bearing (shell type needle bearing) but there may be employed various bearings such as a sliding bearing having a shape omitting a needle from the cup bearing. Also, a method for manufacturing a yoke for a universal joint according to the invention is not limited to the method described in the embodiment. That is, another step(s) can be added thereto, or any one or more of the above-mentioned steps can be omitted therefrom. Or, other various methods can also be employed. Also, the invention is not limited to the press yoke but can also apply to a forged yoke.

This application is based on the Japanese Patent Application No. 2014-99166 filed on May 13, 2014 and the contents thereof are incorporated herein for reference.

DESCRIPTION OF REFERENCE NUMERALS AND SIGNS

1: Steering wheel
2: Steering shaft
3: Universal joint
4: Intermediate shaft
5: Steering gear unit
6: Input shaft 7: Tie rod
8: Outer shaft
9: Inner shaft
10, 10a: Yoke
11, 11a: Base part
12, 12a: Connecting arm part
13, 13a: Discontinuous part (slit)
14, 14a: First flange part
15, 15a: Second flange part
16, 16a: Female serration
17, 17a: Through hole
18, 18a: Screw hole
19, 19a: Circular hole
20, 20a: Base plate part
21, 21a: Tongue-like part
22, 22a: Material plate
23, 23a: First intermediate material
24, 24a: Second intermediate material
25, 25a: Third intermediate material
26, 26a: Fourth intermediate material
27: Cross shaft
28a, 28b: Shaft part
29: Cup bearing
30: Cup
31: Needle
32: Bolt
33 Cylindrical part
34: Bottom part
35: Inward flange part

The invention claimed is:

1. A yoke for a cross shaft universal joint, comprising:
a base part for connecting and fixing an end of a rotation shaft thereto; and
a pair of connecting arm parts formed monolithically with the base part and respectively extending directly in an axial direction from two diametrically opposite positions corresponding to the base part at one axial end edge of the base part, wherein:
the pair of connecting arm parts include a pair of circular holes formed at tip portions thereof to be concentric with each other, the pair of circular holes being configured to pivotally support an end of a shaft part, forming a cross shaft, through bearings;
the base part has a partially-lacking cylindrical shape and includes a discontinuous part penetrating in the axial direction therethrough in one circumferential location of the base part from the one axial end edge of the base part to the other axial end edge of the base part;
the base part includes: a pair of flange parts formed across the discontinuous part and having mutually opposing portions; and a pair of mounting holes formed in the mutually opposing portions of the pair of flange parts; and
the circumferential phases of an arrangement direction of the pair of connecting arm parts and an arrangement direction of the pair of flange parts are shifted from each other, and the flange parts are drawn closer to each other up to a dimension capable of fixing the end of the rotation shaft within the base part, thereby applying mutually approaching forces to the pair of connecting arm parts in directions inclined relative to the axes of the pair of circular holes.

2. The yoke for a cross shaft universal joint according to claim 1, wherein
the axes of the pair of mounting holes are coincident with the thickness directions of the pair of flange parts.

3. The yoke for a cross shaft universal joint according to claim 1, wherein
the axial direction of the axes of the pair of circular holes is set coincident with the arrangement direction of the pair of connecting arm parts, the axial direction of the axes of the pair of mounting holes is set coincident with the arrangement direction of the pair of flange parts, and the circumferential phases of the axial direction of the axes of the pair of circular holes and the axial direction of the axes of the pair of mounting holes are shifted from each other.

4. The yoke for a cross shaft universal joint according to claim 1, wherein
when viewed from the axial direction of the rotation shaft, the axial direction of the axes of the pair of circular holes and the extension direction of the discontinuous part cross each other at non-right angles.

5. The yoke for a cross shaft universal joint according to claim 1, wherein
the mounting hole formed in one of the pair of flange parts is a through hole, while the mounting hole formed in the other is a screw hole.

6. A method for manufacturing a yoke for a cross shaft universal joint including: a base part for connecting and fixing an end of a rotation shaft thereto; and a pair of connecting arm parts formed monolithically with the base part and respectively extending directly in an axial direction from two diametrically opposite positions corresponding to the base part at one axial end edge of the base part, the pair of connecting arm parts including a pair of circular holes formed at tip portions thereof to be concentric with each other, the pair of circular holes being configured to pivotally support an end of a shaft part, forming a cross shaft, through bearings; the base part having a partially-lacking cylindrical shape and including a discontinuous part penetrating in the axial direction therethrough in one circumferential location of the base part from the one axial end edge of the base part to the other axial end edge of the base part; the base part including: a pair of flange parts formed across the discontinuous part and having mutually opposing portions; and a pair of mounting holes formed in the mutually opposing portions of the pair of flange parts, the method comprising the following steps:
forming a flat material plate including a base plate part providing the base plate and a pair of tongue-like parts providing the pair of connecting arm parts, the pair of tongue-like parts being shifted toward the length-direction one side of the base plate part from the length-direction center thereof;
folding back 180° the two ends of the base plate part of the material plate in the same folding amounts to form a first intermediate material;
plastically deforming the first intermediate material such that the pair of tongue-like parts are curved in partially cylindrical shapes, the base end near portions of the pair of tongue-like parts are bent substantially in crank shapes, and the intermediate portions of the pair of tongue-like parts to the leading end near portions thereof are offset with respect to the base plate part, thereby forming a second intermediate material;
curving the base plate part of the second intermediate material to thereby form the base part and the pair of connecting arm parts of the yoke; and
forming the pair of mounting holes in the pair of flange parts and the pair of circular holes in the connecting arm parts.

7. The method for manufacturing a yoke for a cross shaft universal joint according to claim 6, wherein
in the curving step, the base plate part of the second intermediate material is further curved after a central portion of the base plate part of the second intermediate material is curved to form a third intermediate material, thereby forming the base part and the pair of connecting arm parts of the yoke.

\* \* \* \* \*